United States Patent
Sawada

(10) Patent No.: US 9,106,876 B2
(45) Date of Patent: Aug. 11, 2015

(54) IMAGE PROCESSING DEVICE SETTING COLOR CONVERSION METHOD TO METHOD ADEQUATE FOR IMAGE TO BE CONVERTED

(71) Applicant: BROTHER KOGYO KABUSHIKI KAISHA, Nagoya-shi, Aichi-ken (JP)

(72) Inventor: Kazuhide Sawada, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 25 days.

(21) Appl. No.: 14/026,005

(22) Filed: Sep. 13, 2013

(65) Prior Publication Data

US 2014/0092407 A1   Apr. 3, 2014

(30) Foreign Application Priority Data

Sep. 28, 2012  (JP) .................................. 2012-218016

(51) Int. Cl.
*G06F 15/00*     (2006.01)
*G06K 1/00*      (2006.01)
*H04N 1/60*      (2006.01)

(52) U.S. Cl.
CPC ........... *H04N 1/6075* (2013.01); *H04N 1/6027* (2013.01)

(58) Field of Classification Search
None
See application file for complete search history.

(56) References Cited

U.S. PATENT DOCUMENTS

| 8,027,070 B2 * | 9/2011 | Dalrymple .................... 358/520 |
| 2002/0060798 A1 | 5/2002 | Shimada |
| 2003/0025752 A1 * | 2/2003 | Shimizu .......................... 347/16 |
| 2009/0141979 A1 * | 6/2009 | Shinoda et al. ............... 382/167 |
| 2010/0074508 A1 * | 3/2010 | Shinoda et al. ............... 382/133 |
| 2012/0008179 A1 | 1/2012 | Kaigawa |

FOREIGN PATENT DOCUMENTS

| JP | 2001-094694 A | 4/2001 |
| JP | 2002-101312 A | 4/2002 |
| JP | 2008-245029 A | 10/2008 |
| JP | 2011-176463 A | 9/2011 |
| JP | 2012-019483 A | 1/2012 |

* cited by examiner

*Primary Examiner* — Vincent Rudolph
*Assistant Examiner* — Michael Burleson
(74) *Attorney, Agent, or Firm* — Merchant & Gould PC

(57) ABSTRACT

An image processing device includes a processor and a memory storing computer-readable instructions therein. The computer-readable instructions, when executed by the processor, cause the image processing device to perform: acquiring a plurality of hue values from a plurality of pixels of the image; determining an index value of the image based on the plurality of hue values, the index value representing a degree of change in hue of the image before and after executing a color conversion on the image; and setting a color conversion method to a first method when the index value represents that the degree of change in hue of the image is comparatively low, and setting the color conversion method to a second method when the index value represents that the degree of change in hue of the image is comparatively high.

18 Claims, 11 Drawing Sheets

CLASS DEFINITION TABLE

|  | FIRST HUE RANGE HR1 | SECOND HUE RANGE HR2 |
|---|---|---|
| FIRST BRIGHTNESS RANGE VR1 ($0 \leq V < 0.3$) | CLASS 1 | CLASS 4 |
| SECOND BRIGHTNESS RANGE VR2 ($0.3 \leq V < 0.7$) | CLASS 2 | CLASS 5 |
| THIRD BRIGHTNESS RANGE VR3 ($0.7 \leq V \leq 1$) | CLASS 3 | CLASS 6 |

FIG. 7

$$\text{INDEX VALUE TV} = W2 \times \sum_{CN=1}^{6} \{(PN(CN)/PNtotal) \times W1(CN)\}$$

PN(CN) : NUMBER OF PIXELS BELONGING TO CLASS CN
PNtotal: TOTAL NUMBER OF PIXELS IN HISTGRAM
CN: CLASS NUMBER

FIG. 8A
WEIGHT TABLE A

| CLASS NUMBER CN | FIRST WEIGHT W1 |
|---|---|
| CLASS 1 | 0.1 |
| CLASS 2 | 0.5 |
| CLASS 3 | 1 |
| CLASS 4 | 0 |
| CLASS 5 | 0.1 |
| CLASS 6 | 0.25 |

FIG. 8B
WEIGHT TABLE B

| CORRECTION LEVEL | SECOND WEIGHT W2 |
|---|---|
| $\gamma \geq 1.3$ | 1 |
| $\gamma = 1.2$ | 0.8 |
| $\gamma = 1.1$ | 0.5 |
| $\gamma = 1.0$ | 0 |
| $\gamma = 0.9$ | 0.5 |
| $\gamma = 0.8$ | 0.8 |
| $\gamma \leq 0.7$ | 1 |

FIG. 9

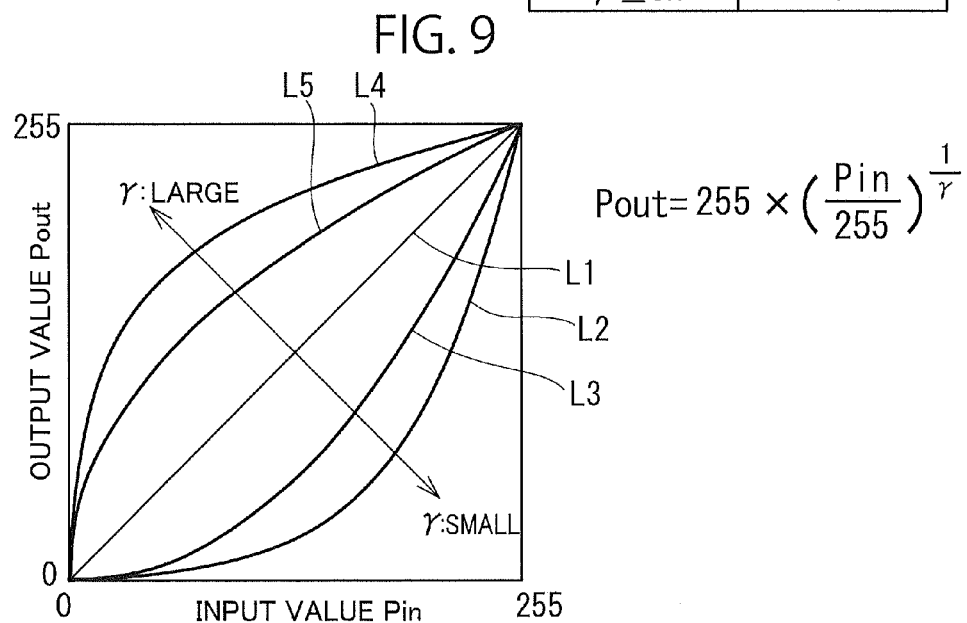

$$P_{out} = 255 \times \left(\frac{P_{in}}{255}\right)^{\frac{1}{\gamma}}$$

H=0

H=15

H=30

H=45

H=60

H=90

H=120

H=150

H=180

BEFORE DENSITY CORRECTION

AFTER DENSITY CORRECTION

BEFORE DENSITY CORRECTION

AFTER DENSITY CORRECTION

BEFORE DENSITY CORRECTION

AFTER DENSITY CORRECTION

WEIGHT TABLE C

| REMOVAL LEVEL (RL=1/Pu) | SECOND WEIGHT W2 |
|---|---|
| Pu<218 | 1 |
| 218≦Pu<226 | 0.8 |
| 226≦Pu<232 | 0.6 |
| 232≦Pu<240 | 0.4 |
| 240≦Pu<258 | 0.2 |
| 248≦Pu<255 | 0 |

IMAGE PROCESSING DEVICE SETTING COLOR CONVERSION METHOD TO METHOD ADEQUATE FOR IMAGE TO BE CONVERTED

CROSS REFERENCE TO RELATED APPLICATION

This application claims priority from Japanese Patent Application No. 2012-218016 filed Sep. 28, 2012. The entire content of the priority application is incorporated herein by reference.

TECHNICAL FIELD

The present invention relates to an image processing device.

BACKGROUND

Various color conversion processing are applied to image data for the purpose of adjusting quality of an image represented based on the image data.

SUMMARY

However, there may be a case where the color conversion processing is performed without sufficient consideration of individual feature of the image data, resulting in application of inadequate color conversion processing.

In view of the foregoing, it is an object of the invention to provide an image processing device capable of executing adequate color conversion processing for image data subject to be processed.

In order to attain the above and other objects, the invention provides an image processing device including a processor and a memory storing computer-readable instructions therein. The computer-readable instructions, when executed by the processor, cause the image processing device to perform: acquiring a plurality of hue values from an image, the image including the plurality of pixels having a plurality of hue values, each of the plurality of pixels having corresponding one of the plurality of hue values, each of the plurality of hue values indicating hue of corresponding one of the plurality of pixels; determining an index value of the image based on the plurality of hue values, the index value representing a degree of change in hue of the image before and after executing a color conversion on the image; and setting a color conversion method to a first method when the index value represents that the degree of change in hue of the image is comparatively low, and setting the color conversion method to a second method when the index value represents that the degree of change in hue of the image is comparatively high.

According to another aspect, the present invention provides a non-transitory computer readable storage medium storing computer-readable instructions, when executed by a processor, causing an image processing device to perform: acquiring a plurality of hue values from an image, the image including the plurality of pixels having a plurality of hue values, each of the plurality of pixels having corresponding one of the plurality of hue values, each of the plurality of hue values indicating hue of corresponding one of the plurality of pixels; determining an index value of the image based on the plurality of hue values, the index value representing a degree of change in hue of the image before and after executing a color conversion on the image; and setting a color conversion method to a first method when the index value represents that the degree of change in hue of the image is comparatively low, and setting the color conversion method to a second method when the index value represents that the degree of change in hue of the image is comparatively high.

BRIEF DESCRIPTION OF THE DRAWINGS

The particular features and advantages of the invention as well as other objects will become apparent from the following description taken in connection with the accompanying drawings, in which:

FIG. 7 shows an expression for calculating the index value;

FIGS. 8A and 8B show examples of weight tables;

FIG. 9 is an explanatory diagram illustrating relationships between tone curves and correction levels;

DETAILED DESCRIPTION

A. First Embodiment

A-1: Configuration of Multifunction Peripheral 200

Figure 1:
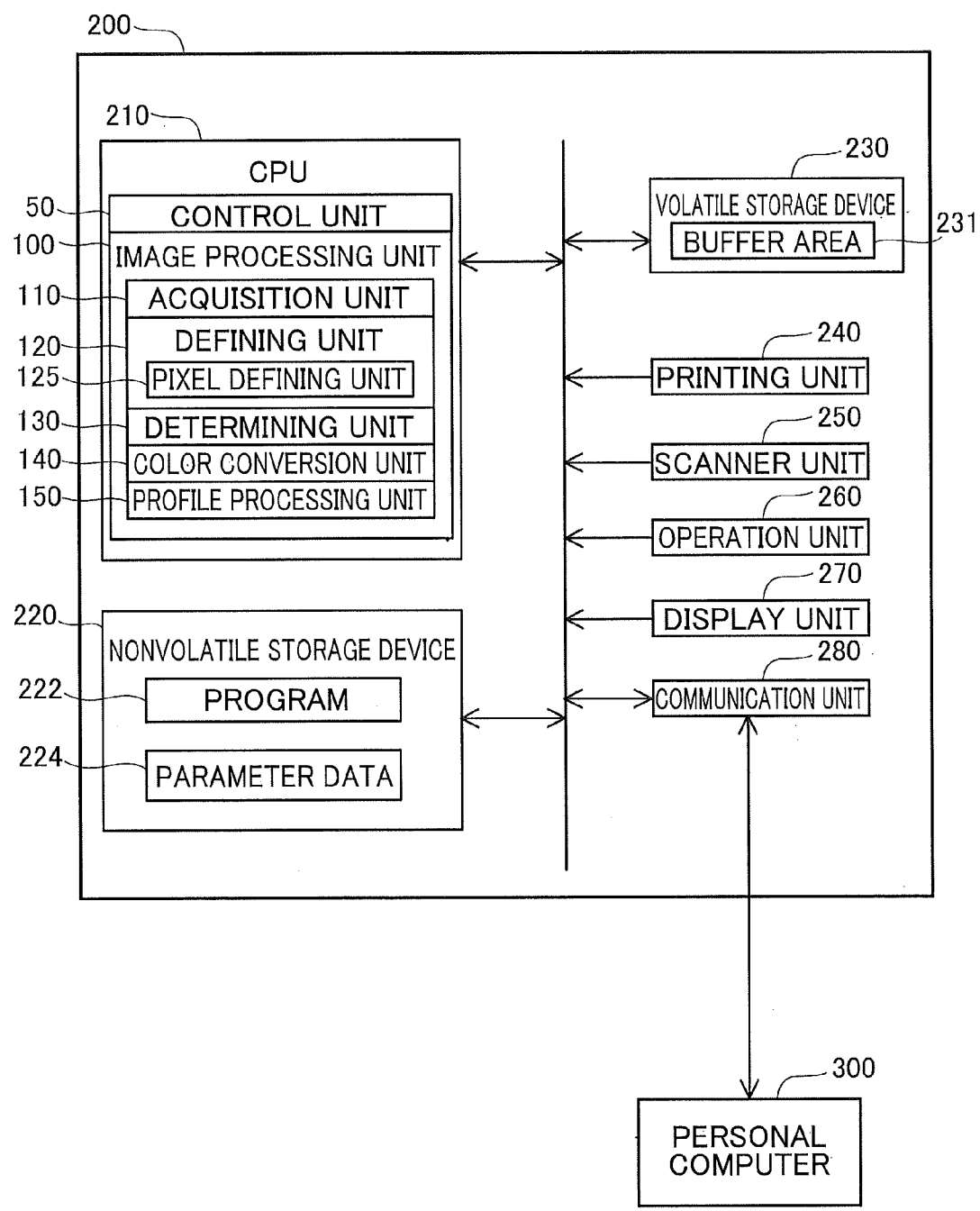
FIG. 1 is a block diagram showing an image processing device according to a first embodiment of the present invention.

As shown in FIG. 1, a multifunction peripheral 200 according to a first embodiment of the present invention includes a CPU 210, a nonvolatile storage device 220 such as a hard disk drive or an EEPROM, a volatile storage device 230 such as a RAM, a printing unit 240 configured to print an image according to a predetermined system (e.g., inkjet system or laser system), a scanner unit 250 configured to optically read a target (e.g., paper document) to acquire scan data, an operation unit 260 such as a touch panel or a button, a display unit 270 such as a liquid crystal panel having the touch panel thereon, and a communication unit 280 including an interface for performing data communication with an external device such as a personal computer 300 or a USB memory (not shown).

The nonvolatile storage device 220 stores a program 222 and parameter data 224. The program 222 is provided in the form of being stored in a CD-ROM or a DVD-ROM. Alternatively, the program 222 is downloaded from a server connected to the multifunction peripheral 200 over a network.

Further alternatively, the program 222 is previously installed in the multifunction peripheral 200 before shipping. The parameter data 224 includes various parameters to be used in image processing to be described later. The volatile storage device 230 has a buffer area 231 configured to temporarily store various intermediate data generated when the CPU 210 performs processing.

The CPU 210 executes the program 222 to thereby realize functions of a control unit 50 that controls the entire operation of the multifunction peripheral 200 and an image processing unit 100 that executes image processing to be described later. The image processing unit 100 includes an acquisition unit 110, a defining unit 120, a determining unit 130, a color conversion unit 140, and a profile processing unit 150. The acquisition unit 110 is configured to acquire a hue value H of each pixel using target image data. The defining unit 120 is configured to define and determine an index value TV using the hue value H of each pixel. The index value TV is a value representing a hue change degree when color conversion processing such as density correction is executed. The defining unit 120 includes a pixel defining unit 125 configured to define the hue change degree for each pixel. The determining unit 130 determines, depending on the index value TV, a method for the color conversion processing. The color conversion unit 140 executes the color conversion processing for target image data using a method determined by the determining unit 130. The profile processing unit 150 adds, to the target image data, a profile (e.g., ICC profile) for execution of the color conversion processing using a method determined by the determining unit 130. Hereinafter, image processing executed by the above functional sections will be described.

A-2: Image Processing

Figure 2:
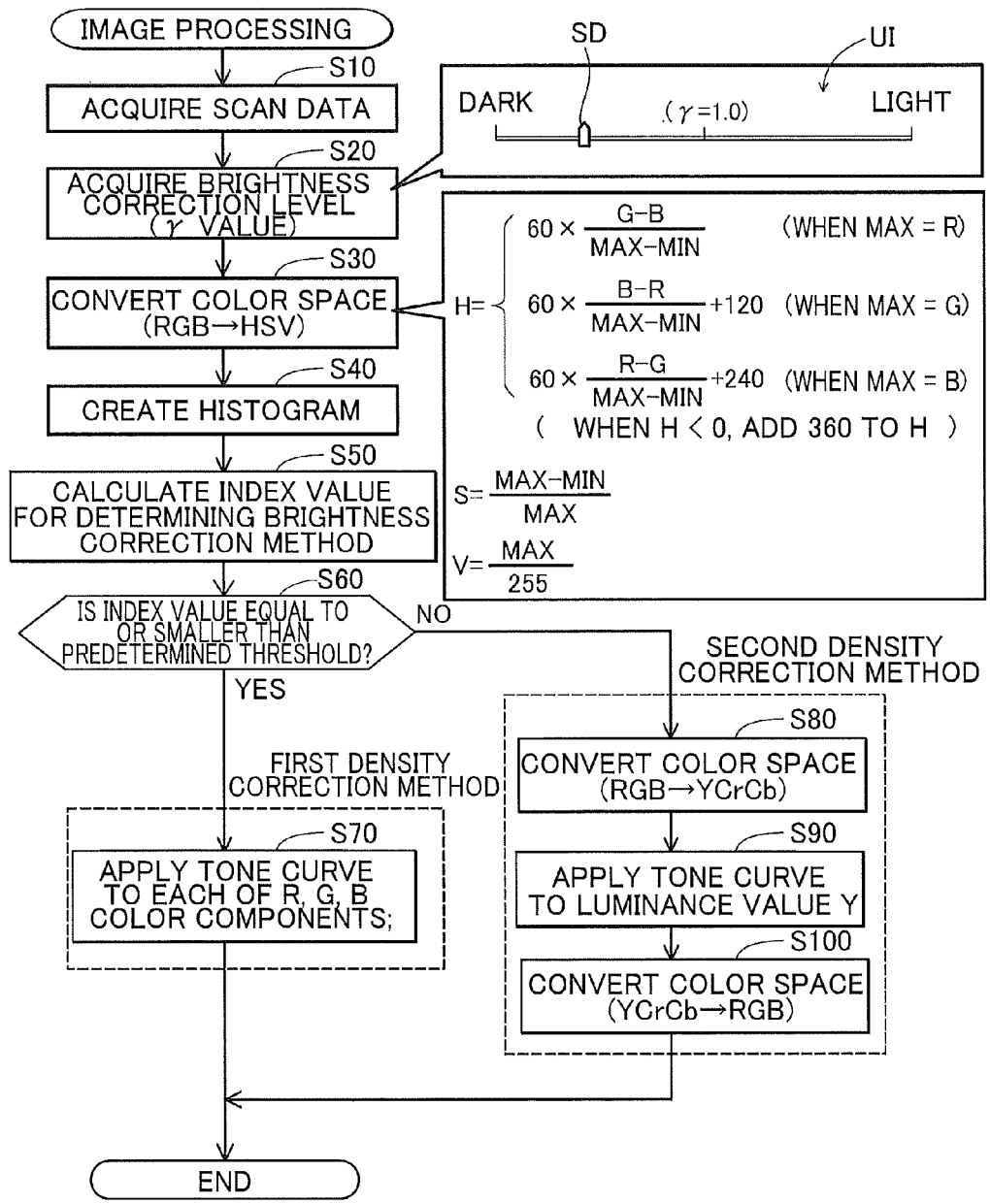
FIG. 2 is a flowchart illustrating steps in an image processing executed by the image processing device according to the first embodiment.

FIG. 2 is a flowchart illustrating an image processing according to the first embodiment. This image processing is executed when a user sets a document on the scanner unit 250 and makes a reading instruction, or when a user specifies scan data that has been already generated and stored in the nonvolatile storage device 220 and makes a density correction instruction.

In S10, the image processing unit 100 (FIG. 1) acquires scan data as a target image to be processed. The image processing unit 100 acquires the target data by reading a document using the scanner unit 250 or by retrieving scan data from the nonvolatile storage device 220. The target data is bit map data in which a color of each pixel is represented by RGB values. In the present embodiment, three color component values of RGB each can assume a value within a range of 0 to 255. That is, the three color component values of RGB are each represented in 256 gray levels.

Subsequently, in S20, the image processing unit 100 acquires a brightness correction level. For example, the correction level is input by the user through an input screen UI shown in FIG. 2. The input screen UI is displayed on the display unit 270, and the user can input a correction level CL by operating a slider SD through the operation unit 260. The correction level CL is represented by a γ value that determines a tone curve described later. The γ value is set to 1 when the brightness is not changed. When the brightness needs to be increased, γ is set to a value larger than 1. The higher of a degree of increase in the brightness, the larger the γ value to be set is. Conversely, when the brightness needs to be reduced, γ is set to a value larger than 0 and smaller than 1. The higher of a degree of reduction in the brightness, the smaller the γ value to be set is. In the input screen UI shown in FIG. 2, a center of a horizontal axis corresponding to a movable range of the slider SD corresponds to "γ=1.0" which represents that the brightness is not changed. The more rightward the user moves a position of the slider SD from its center in the input screen UI, the higher the brightness can be; while the more leftward the user moves the position of the slider SD from its center, the lower the brightness can be.

Subsequently, in S30, the acquisition unit 110 (FIG. 1) converts color values (e.g., color value in an RGB color space) of each pixel constituting the target image data into color values in an HSV color space. In other words, the color space is converted. Accordingly, the acquisition unit 10 acquires a plurality of hue values H from the target image data representing an image including a plurality of pixels. Each pixel has a hue value indicating hue of corresponding one of the plurality of pixels. A conversion expression for converting the color values (i.e., R, G, B) in the RGB color space into the color values (i.e., H, S, V) in the HSV color space is shown in FIG. 2. In the expression shown in FIG. 2, MAX represents the maximum value of the three RGB component values, and MIN represents the minimum value of the three RGB component values. The target image data after conversion is stored in the buffer area 231. The target image data before conversion is used in density correction to be described later and is thus not deleted but kept in the buffer area 231.

As shown in FIG. 2, when MAX is R, the hue value H is represented as: H=60×{(G−B)/(MAX−MIN)}. When MAX is G, the hue value H is represented as: H=60×{(B−R)/(MAX−MIN)}+120. When MAX is B, the hue value H is represented as: H=60×{(R−G)/(MAX−MIN)}+240. When the hue value H assumes a negative value (H<0) in the above expression, a value obtained by adding 360 to a calculated value from the expression of FIG. 2 is set as the hue value H.

A saturation value S is represented as: S=(MAX−MIN)/MAX: A brightness value V is represented as: V=MAX/255.

The hue value H can assume a value within a range of 0≤H<360, the saturation value S can assume a value within a range of 0≤S, and the brightness value V can assume a value within a range of V≤1.

After the color space conversion, in S40, the pixel defining unit 125 creates a histogram for index value calculation and stores the histogram in the buffer area 231.

Figures 3, 4:
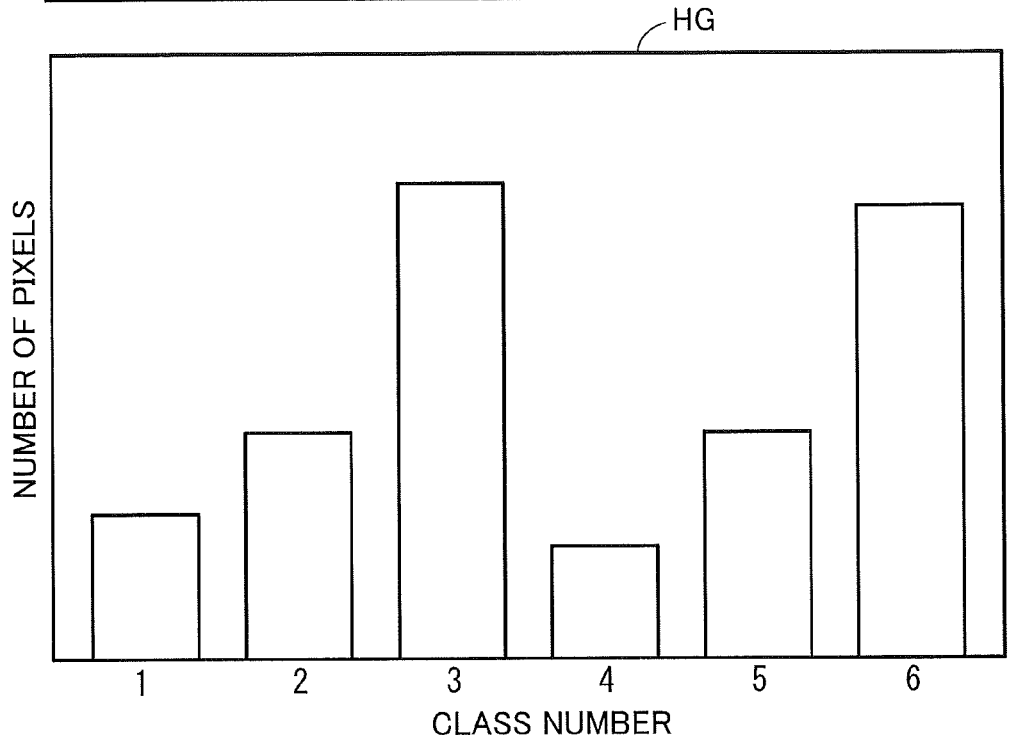
FIG. 3 is a graph showing an example of a histogram for index value calculation.
FIG. 4 is a diagram showing an example of class definition table.

FIG. 3 shows an example of a histogram HG for index value calculation. As shown in FIG. 3, in the histogram HG, a plurality of pixels constituting the target image data is classified into six classes, and the number of pixels belonging to each class is counted. The six classes are defined by a class definition table recorded in the parameter data 224 (FIG. 1).

FIG. 4 is an example of the class definition table that defines the class of the histogram HG. As is clear from the table of FIG. 4, the six classes of the histogram HG are defined by a range of the brightness value V (i.e., brightness range) and a range of the hue value H (i.e., hue range).

Figure 5:
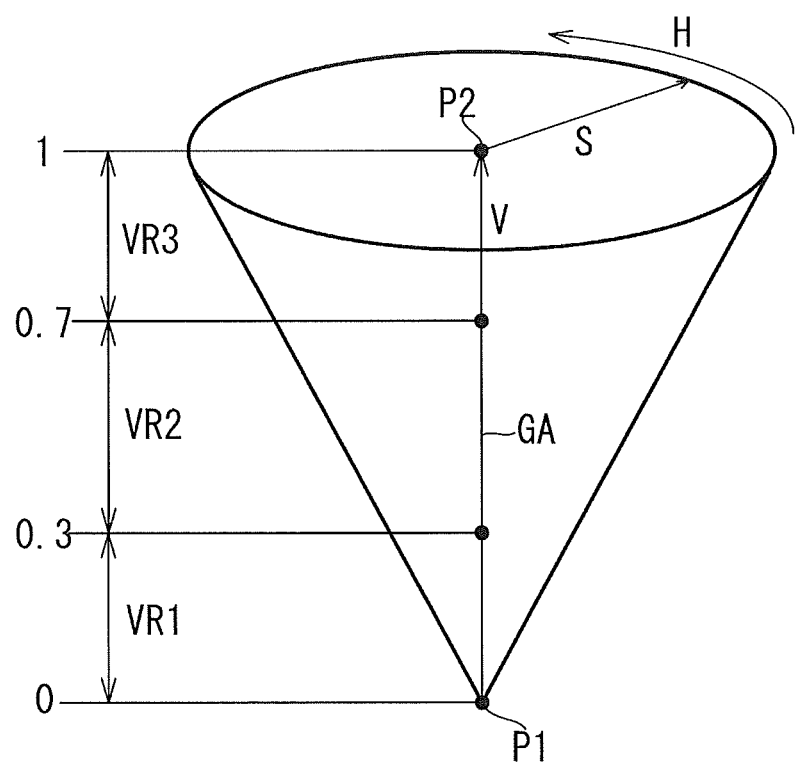
FIG. 5 is an explanatory diagram illustrating ranges of brightness values.

FIG. 5 is an explanatory diagram illustrating the range of the brightness value V. FIG. 5 conceptually shows the HSV color space. As shown in FIG. 5, the HSV color space has a conical shape. A line connecting an apex P1 of the cone and a center point P2 of a bottom surface of the cone is an achromatic color axis GA of the HSV color space. The apex P1 of the cone is a point at which the brightness value V is the minimum value "0", and the center point P2 of the bottom surface of the cone is a point at which the brightness value V is the maximum value "1". As shown in FIG. 5, in the HSV color space, the saturation value S is represented by a distance from the achromatic color axis GA, and the brightness value V is represented by a position on the achromatic color axis GA.

The class definition table (FIG. 4) defines three brightness ranges shown in FIG. 5: first brightness range VR1

($0 \leq V < 0.3$); second brightness range VR2 ($0.3 \leq V < 0.7$); and third brightness range VR3 ($0.7 \leq V \leq 1$).

Figure 6:
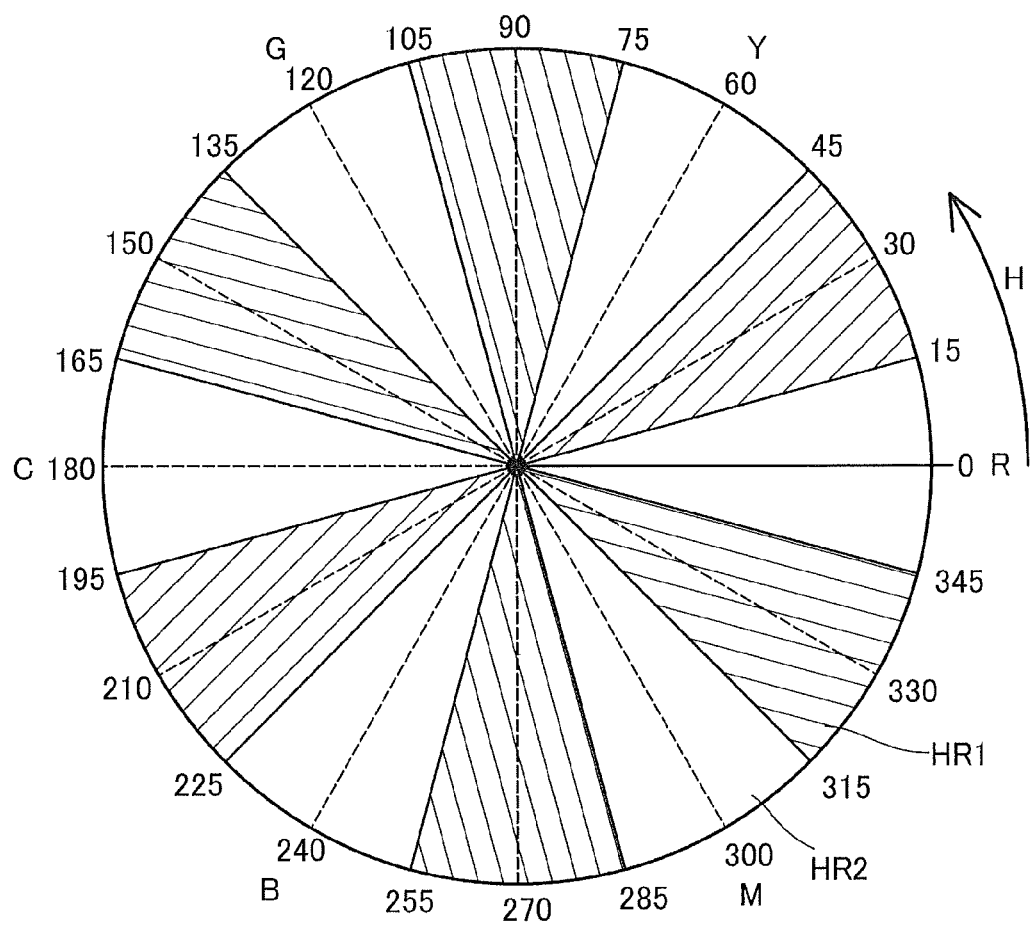
FIG. 6 is an explanatory diagram illustrating ranges of hue values.

FIG. 6 is an explanatory diagram illustrating the range of the hue value H. FIG. 6 shows a shape of the HSV color space as viewed in a direction along the achromatic color axis. The hue value H is represented by a circumferential direction position on a circle (FIG. 6) which is a shape of the HSV color space as viewed in the direction along the achromatic color axis. For example, as shown in FIG. 6, "hue value=0" represents red (R), "hue value=120" represents green (G), and "hue value=240" represents blue (B). Further, "hue value=60" represents yellow (Y), "hue value=180" represents cyan (C), and "hue value=300" represents magenta (M).

Further, the class definition table (FIG. 4) defines two hue ranges shown in FIG. 6: first hue range HR1 (hatched); and second hue range HR2 (not hatched).

The first hue range HR1 includes six ranges: ($15 \leq H < 45$); ($75 \leq H < 105$); ($135 \leq H < 165$); ($195 \leq H < 225$); ($255 \leq H < 285$); and ($315 \leq H < 345$). The second hue range HR2 includes six ranges: ($345 \leq H < 360$ and $0 \leq H < 15$); ($45 \leq H < 75$); ($105 \leq H < 135$); ($165 \leq H < 195$); ($225 \leq H < 255$); and ($285 \leq H < 315$).

As can be seen from the above description, the first hue range HR1 and second hue range HR2 are arranged so as to alternately and periodically appear with a sequential change in the hue value H from 0 to 360.

As shown in FIG. 4, the six classes of the histogram HG are as follows:

class 1: brightness value V falls within first brightness range VR1, and hue value H falls within first hue range HR1;

class 2: brightness value V falls within second brightness range VR2, and hue value H falls within first hue range HR1;

class 3: brightness value V falls within third brightness range VR3, and hue value H falls within first hue range HR1;

class 4: brightness value V falls within first brightness range VR1, and hue value H falls within second hue range HR2;

class 5: brightness value V falls within second brightness range VR2, and hue value H falls within second hue range HR2; and class 6: brightness value V falls within third brightness range VR3, and hue value H falls within second hue range HR2.

In the above-mentioned step S40 (FIG. 2), the pixel defining unit 125 sorts each of the plurality of pixels to be sorted included in the target image data into one of the above six classes according to the hue value H and brightness value V of each pixel, to thereby create the histogram HG of FIG. 3. A pixel for which the hue value H cannot be calculated, that is, a pixel having equal RGB values (R=G=B), is excluded from the pixels to be sorted. As described later, an weight W1 representing "hue change degree" for each pixel is associated with each class, so that sorting of each pixel into one of the six classes by the pixel defining unit 125 is equivalent to defining "hue change degree (weight W1)" for each pixel.

After creation of the histogram HG, in S50, the defining unit 120 uses the histogram HG to calculate the index value TV of a target image represented by the target image data and stores the calculated index value in the buffer area 231. The index value TV is a value for determining a brightness correction method. The index value TV represents the hue change degree of the target image when brightness correction is applied to the target image data.

FIG. 7 shows an expression for calculating the index value TV. That is, the defining unit 120 calculates, for each class, a class index value CTV(CN) by multiplying, by a first weight W1(CN) defined for each class, a ratio of the number PN(CN) of pixels belonging to a class CN relative to a total number $PN_{total}$ of pixels in the histogram HG. The CN is a class number which is an integer from 1 to 6. As can be seen from the above description, the class index value CTV(CN) is represented by the following expression.

$$CTV(CN) = \{(PN(CN)/PN_{total}) \times W1(CN)\}$$

As shown in FIG. 7, the defining unit 120 calculates the index value TV of the target image by multiplying a total value obtained by summing all the six class index values CTV(CN) calculated for respective classes by a second weight W2.

FIGS. 8A and 8B are views each showing an example of a table defining the weight for calculating the index value TV. Contents listed in these tables are recorded in the parameter data 224 (FIG. 1). FIG. 8A shows a table defining the first weight W1. The first weight W1 is a value representing the hue change degree of a pixel belonging to the class CN when the density correction is applied thereto. As shown in FIG. 8A, the first weight W1 is defined for each class. The larger the first weight W1 is, the higher the hue change degree; on the other hand, the smaller the first weight W1 is, the lower the hue change degree.

As can be seen from a comparison between the first weights W1 of classes 1 to 3 corresponding to the first hue range HR1, larger first weight W1 is assigned to a class corresponding to a range of the larger brightness value V. Similarly, as can be seen from a comparison between the second weights W2 of classes 4 to 6 corresponding to the second hue range HR2, larger first weight W1 is assigned to a class corresponding to a range of the larger brightness value V. That is, the pixel defining unit 125 defines and determines higher hue change degree for a pixel having a larger brightness value V, and defines lower hue change degree for a pixel having a smaller brightness value V. This is because the hue change is less noticeable in the pixel having a smaller brightness value V (i.e., darker pixel), while the hue change is easily noticeable in the pixel having a larger brightness value V (i.e., brighter pixel).

Further, as can be seen from a comparison between the first weights W1 of the two classes corresponding to the same brightness range, the first weight W1 of the class corresponding to the first hue range HR1 is larger than that of the class corresponding to the second hue range HR2. For example, when comparing the classes 1 and 4 corresponding to the first brightness range VR1, the first weight W1(1) of the class 1 is larger than the first weight W1(4) of the class 4. Similarly, the first weight W1(2) of the class 2 is larger than the first weight W1(5) of the class 5, and the first weight W1(3) of the class 3 is larger than the first weight W1(6) of the class 6. That is, the pixel having a hue value within the first hue range HR1 is defined to have a higher hue change degree than that having a hue value within the second hue range HR2. The reason for this will be described later.

FIG. 8B shows a table defining the second weight W2. The second weight W2 is a value having a positive correlation with the hue change degree of the target image when the density correction is applied to the target image data with a correction level (e.g., γ value) acquired in S20. Like the first weight W1, the larger the second weight W2 is, the higher the hue change degree; on the other hand, the smaller the second weight W2 is, the lower the hue change degree.

FIG. 9 is a diagram explaining a tone curve according to the correction level (γ value). A graph of FIG. 9 shows an example of tone curves used in brightness correction. In the graph of FIG. 9, a horizontal axis represents an input value Pin, and a vertical axis represents an output value Pout. Each tone curve of FIG. 9 is a curve associating the input value Pin with the output value Pout. In other words, the tone curve defines relationships between the input values Pin and the output values Pout. Tone curves L2 to L5 are each represented by an expression (see FIG. 9). The output value Pout is set to a value obtained by multiplying $(1/\gamma)$ power of a value (Pin/255) by the maximum tone value of 255 as a coefficient. The value (Pin/255) is obtained by normalizing the input value Pin.

In FIG. 9, a straight line L1 represents that the input value Pin and output value Pout are equal to each other and corresponds to $\gamma=1$. The further the tone curve to be used in the density correction is away from the straight line L1, the larger a variation between a pixel value before correction and a pixel value after correction is (i.e., the higher a correction level is). The tone curves L4 and L5 are tone curves each having a value of $\gamma$ larger than 1 and are each used for increasing the brightness. A correction level obtained by using the tone curve L4 is higher than that obtained by using the tone curve L5. The tone curves L2 and L3 are tone curves each having a value of $\gamma$ smaller than 1 and are each used for reducing the brightness. A correction level obtained by using the tone curve L2 is higher than that obtained by using the tone curve L3.

As can be seen from the above description, the larger an absolute value of $(\gamma-1)$, the higher the correction level. As shown in FIG. 8B, the second weight W2 is set so as to be increased as the absolute value of $(\gamma-1)$, i.e., correction level is increased.

As can be seen from FIG. 9, the tone curves to be used in the density correction of the first embodiment have an upwardly convex shape (L4, L5) or a downwardly convex shape (L2, L3). Further, the tone curves L2 to L5 do not cross the straight line L1. In other words, the tone curves L2 to L5 each do not have an intersection with the straight line L1.

The index value TV of the target image is calculated using the first weight W1, second weight W2, the number PN(CN) of pixels belonging to each class set in the histogram HG, and total number $PN_{total}$ of pixels in the histogram HG. As is clear from the calculation expression of FIG. 7, it can be said that the index value TV is a value determined in accordance with a ratio among the number of pixels to be sorted into the six classes. Further, since the pixel having the hue value H within the first hue range HR1 and pixel having the hue value H within the second hue range HR2 are multiplied by different first weights W1, it can also be said that the index value TV is a value determined in accordance with a ratio between the number of pixels having the hue value H within the first hue range HR1 and the number of pixels having the hue value H within the second hue range HR2. Similarly, it can be said that the index value TV is a value determined in accordance with a ratio among the number of pixels to be sorted into the three brightness ranges VR1 to VR3.

After calculation of the index value TV, in S60, the determining unit 130 determines whether the index value TV is equal to or smaller than a predetermined threshold TH. When the index value TV is equal to or smaller than the predetermined threshold TH (YES in S60), that is, when the index value TV represents that the hue change degree is comparatively low, the determining unit 130 determines to execute the density correction using a first method, and a processing flow of this routine proceeds to S70. The threshold TH is experimentally determined to an adequate value in advance and is set to 0.2 in the first embodiment.

In S70, the color conversion unit 140 executes the density correction for the target image data according to the first method and stores target image data after the density correction in the buffer area 231. In other words, the color conversion unit 140 sets to the color conversion method to the first method. Specifically, as the first method, the color conversion unit 140 applies the tone curves of FIG. 9 to each of the three component data (R component data, G component data, B component data) included in the target image data to thereby correct the three component data. The above first method is a simple method, and a processing load incurred by the first method is lower than that of a second method described later. That is, the first method is smaller in calculation amount than the second method. A possibility that the hue of the target image changes after the density correction is higher in the case where the first method is used than in the case where the second method is used.

On the other hand, when the index value TV is larger than the predetermined threshold TH (NO in S60), that is, when the index value TV represents that the hue change degree is comparatively high, the determining unit 130 determines to execute the density correction using the second method, and the processing flow proceeds to steps S80 to S100.

In steps S80 to S100, the color conversion unit 140 executes the density correction for the target image data according to the second method, and stores target image data after the density correction in the buffer area 231. In other words, the color conversion unit 140 sets to the color conversion method to the second method. Specifically, in S80, the color conversion unit 140 converts the color space of the target image data from the RGB color space into YCrCb color space. That is, the color conversion unit 140 converts each pixel data (i.e., color value in the RGB color space) constituting the target image data into a color value in the YCrCb color space. Subsequently, in S90, the color conversion unit 140 applies the tone curves of FIG. 9 to a luminance value Y of a plurality of pixels constituting the target image data after color space conversion to thereby correct the luminance value Y of the target image data. Subsequently, in S100, the color conversion unit 140 converts the color space of the target image data after correction of the luminance value Y from the YCrCb color space into the RGB color space. A processing load incurred by the second method is higher than that of the first method. That is, the second method is larger in calculation amount than the first method. Processing time is longer in the case where the second method is used than in the case where the first method is used. However, the hues represented by CrCb in the YCrCb color space are not corrected but only the brightness represented by Y is corrected, so that the possibility that the hue of the target image after the correction changes becomes low.

After completion of the brightness correction for the target image, the image processing unit 100 ends the image processing. The target image data after the density correction is supplied to, e.g., the personal computer 300 or stored in the nonvolatile storage device 220.

A-3: Hue Change Degree Brought about by Correction

Hereinafter, the reason that the pixel having a hue value within the first hue range HR1 is defined to have a higher hue change degree than that having a hue value within the second hue range HR2 in the calculation of the index value TV (FIG. 4, FIG. 8A) will be described.

Figure 10A:
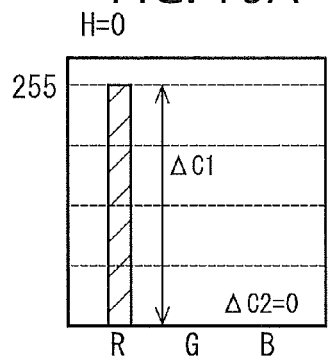
FIGS. 10A to 10I are graphs showing relationships between RGB component values and hue values.

FIGS. 10A to 10I are diagrams each showing an example of a color having a specific hue value H (H=0, 15, 30, . . . , 180) by the RGB component values. In a color (red) having a hue value H of 0, as shown in FIG. 10A as a typical example, the R component value (e.g., 255) is larger than the G component value and B component value, and G component value and B component value are equal to each other (e.g., 0). That is, the color having a hue value H of 0 is a color in which a first difference ΔC1 between the largest component value and the second highest (i.e., intermediate) component value is maximum (255, in this case) and a second difference ΔC2 between the second highest component value and smallest component value is minimum (0, in this case). Examples of the hue in which the first difference ΔC1 is maximum and the second difference ΔC2 is minimum include green (H=120) and blue (H=240), in addition to the red.

Figure 10B:
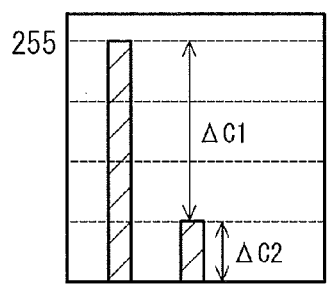
Figure 10C:
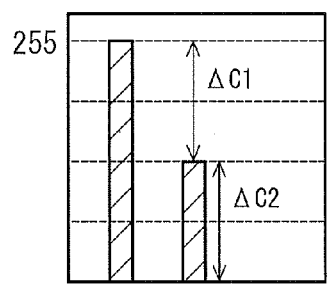
Figure 10D:
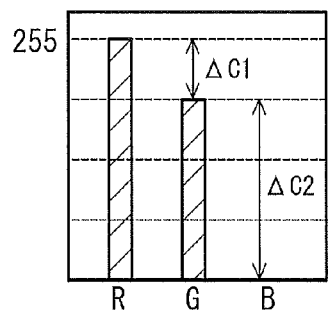
Figure 10E:
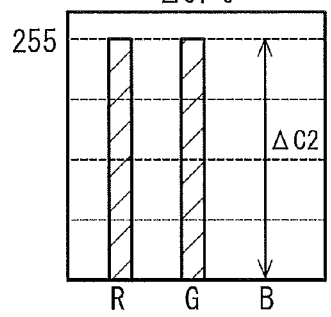

As the hue value H changes from 0 to 60, the G component value increases stepwise, with the result that the first difference ΔC1 reduces relatively, and the second difference ΔC2 increases relatively. For example, in a color having a hue value H of 15, as shown in FIG. 10B as a typical example, a ratio between the first difference ΔC1 and second difference ΔC2 is 3:1. In a color having a hue value H of 30, as shown in FIG. 10C as a typical example, the first difference ΔC1 and second difference ΔC2 are equal to each other. In a color having a hue value H of 45, as shown in FIG. 10D as a typical example, the second difference ΔC2 becomes larger than the first difference ΔC1, and a ratio therebetween is 1:3. In a color having a hue value H of 60 (i.e. yellow), the R component value and G component value are equal to each other, and the B component value becomes smaller (e.g., 0) than the R component value and G component value. Thus, in the color (yellow) having a hue value H of 60, the first difference ΔC1 is minimum, and second difference ΔC2 is maximum (255, in this case) (FIG. 10E). Examples of the hue in which the first difference ΔC1 is minimum (0, in this case) and the second difference ΔC2 is maximum include cyan (H=180) and magenta (H=300), in addition to the yellow.

Figure 10F:
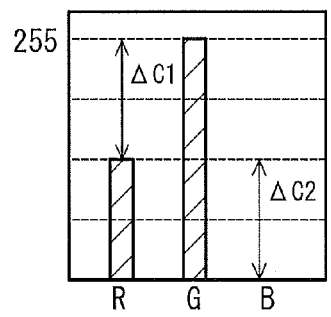
Figure 10G:
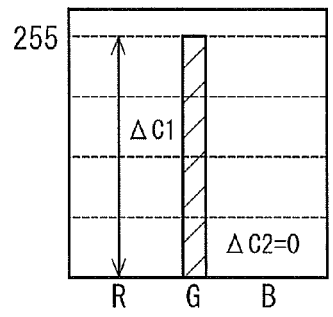

As the hue value H changes from 60 to 120, the R component value reduces stepwise, with the result that the first difference ΔC1 increases relatively, and the second difference ΔC2 decreases relatively. For example, in a color having a hue value H of 90, as shown in FIG. 10F as a typical example, the first difference ΔC1 and second difference ΔC2 are equal to each other. In a color having a hue value H of 120, as shown in FIG. 10G as a typical example, the first difference ΔC1 is maximum (255, in this case) and the second difference ΔC2 is minimum (0, in this case) as in the color having a hue value H of 0.

Figure 10H:
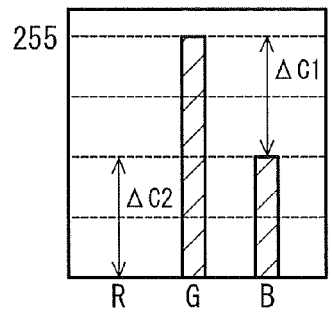
Figure 10I:
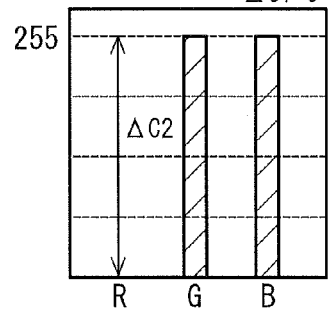

As the hue value H changes from 120 to 180, the B component value increases stepwise, with the result that the first difference ΔC1 decreases relatively, and the second difference ΔC2 increases relatively. For example, in a color having a hue value H of 150, as shown in FIG. 10H as a typical example, the first difference ΔC1 and second difference ΔC2 are equal to each other. In a color having a hue value H of 180, as shown in FIG. 10I as a typical example, the first difference ΔC1 is minimum (0, in this case) and the second difference ΔC2 is maximum (255, in this case) as in the color having a hue value H of 60.

As can be seen from the above description, when the hue value H changes from 0 to 360, the hue values H (H=0, 120, 240) in which the first difference ΔC1 is maximum and second difference ΔC2 is minimum and hue values H (H=60, 180, 360) in which the first difference ΔC1 is minimum and second difference ΔC2 is maximum alternately appear every time the hue value H changes by 60. The hue value H (H=0, 120, 240) in which the first difference ΔC1 is maximum and second difference ΔC2 is minimum is referred to as a hue value for maximum first difference, and hue value H in which the first difference ΔC1 is minimum and second difference ΔC2 is maximum is referred to as a hue value for maximum second difference.

In the intermediate hue values H (H=30, 90, 150, 210, 270, 330), the first difference ΔC1 and second difference ΔC2 are equal to each other. The hue value H in which the first difference ΔC1 and second difference ΔC2 are equal to each other is referred to as a hue value for equal difference.

That is, when the hue value H is changed from 0 to 360, the three types of hue values alternately and periodically appear in the following order: hue value for maximum first difference, hue value for equal difference, hue value for maximum second difference, and hue value for equal difference.

Figure 11A:
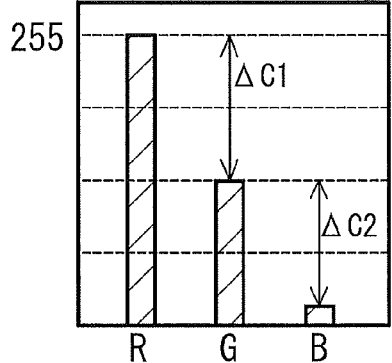
FIGS. 11A to 13B are graphs each for explaining change in hue between before and after the density correction.
Figure 11B:
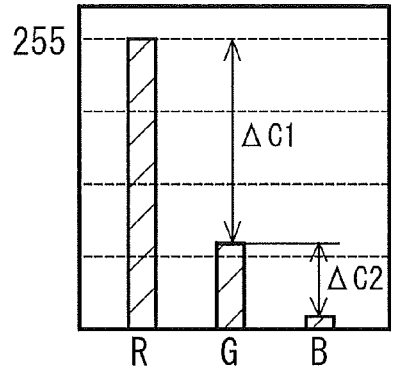

FIGS. 11A to 13B are graphs each for explaining how much the hue changes by the density correction. FIG. 11A shows an example of RGB values representing a hue in the vicinity of the hue value for equal difference. FIG. 11B shows RGB values obtained by applying the tone curves to each of the color component values (R component value, G component value, B component value) of the RGB values of FIG. 11A for the density correction. In this example, density correction that reduces the brightness as denoted by the tone curve L2 of FIG. 9 is executed. As shown in FIGS. 11A and 11B, in the RGB values representing the hue in the vicinity of the hue value for equal difference, a variation in the intermediate component value (G component value, in this example) before and after the correction is larger than variations in the maximum and minimum component values (R component value and B component value, in this example) before and after the correction. This is because, in the tone curves for brightness correction, a variation in the vicinity of a center of a value range that the input value Pin can assume is large, and variations in the vicinity of both end portions of the value range (i.e., upper and lower limit values) are small. As a result, a ratio between the first difference ΔC1 and second difference ΔC2 significantly changes before and after the correction. As is clear from the calculation expression of FIG. 2, the hue value H is determined by a ratio between a difference (first difference ΔC1+second difference ΔC2) between a maximum component value MAX and a minimum component value MIN and the second difference ΔC2, so that the more the ratio between the first difference ΔC1 and second difference ΔC2 changes, the more the hue value H changes. Thus, it can be understood that a pixel having a hue in the vicinity of the hue value for equal difference is subject to a large hue change by the density correction. For example, in the example of FIGS. 11A and 11B, as a result of the density correction, the hue changes in a direction that a red component increases.

Figure 12A:
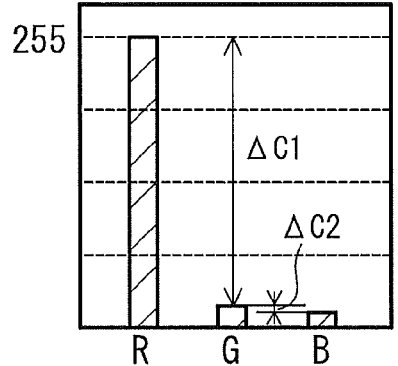
Figure 12B:
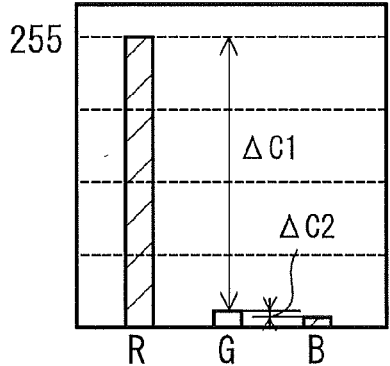

FIG. 12A shows an example of RGB values representing a hue in the vicinity of the hue value for maximum first difference. FIG. 12B shows RGB values obtained by applying the tone curves to each of the color component values of the RGB values of FIG. 12A for the density correction. In this example, density correction that reduces the brightness as denoted by the tone curve L2 of FIG. 9 is executed. As shown in FIGS. 12A and 12B, in the RGB values representing the hue in the vicinity of the hue value for maximum first difference, the three component values change little before and after the correction. This is because, as shown in FIG. 12A, the three component values are each a value in the vicinity of the upper or lower limit value and, as described above, variations in the vicinity of both end portions (i.e., upper and lower limit values) in the tone curve for brightness correction are small. As a result, a ratio between the first difference ΔC1 and second difference ΔC2 changes little before and after the correction. Thus, it can be understood that a pixel having a hue in the vicinity of the hue value for maximum first difference is subject to a smaller hue change by the density correction than a pixel having a hue in the vicinity of the hue value for equal difference.

Figure 13A:
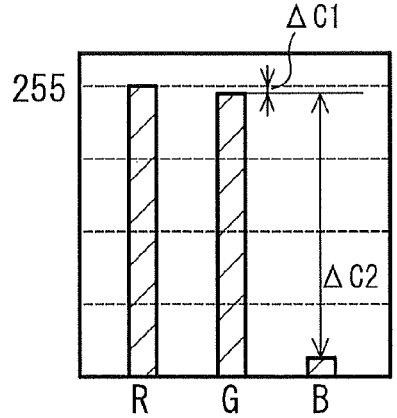
Figure 13B:
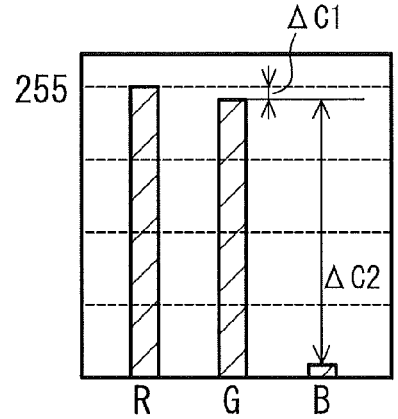

FIG. 13A shows an example of RGB values representing a hue in the vicinity of the hue value for maximum second difference. FIG. 13B shows RGB values obtained by applying the tone curves to each of the color component values of the RGB values of FIG. 13A for the density correction. In this example, density correction that reduces the brightness as denoted by the tone curve L2 of FIG. 9 is executed. As shown in FIGS. 13A and 13B, in the RGB values representing the hue in the vicinity of the hue value for maximum second difference, the three component values change little before and after the correction. This is because, as shown in FIG. 13A, each of the three component values is a value in the vicinity of the upper or lower limit value and, as described above, variations in the vicinity of both end portions (i.e., upper and lower limit values) in the tone curve for brightness correction are small. As a result, a ratio between the first difference ΔC1 and second difference ΔC2 changes little before and after the correction. Thus, it can be understood that, as in the case of the pixel having a hue in the vicinity of the hue value for maximum first difference, a pixel having a hue in the vicinity of the hue value for maximum second difference is subject to a smaller hue change by the density correction than the pixel having a hue in the vicinity of the hue value for equal difference.

As is clear from FIG. 6, in the first embodiment, the first hue range HR1 is set in hue ranges in the vicinity of six hue values for equal difference (H=30, 90, 150, 210, 270, 330), specifically, hue ranges of ±15 from the respective hue values for equal difference. Further, as can be seen from FIG. 8A, the larger first weight W1 than that assigned to the second hue range HR2 is assigned to the first hue range HR1, so that a pixel having a hue value within the first hue range HR1 is defined to have a comparatively high hue change degree. As a result, the hue change degree of the pixel constituting the target image can adequately be defined according to the hue value H, when the density correction is executed. Thus, an adequate density correction method can be determined.

Assuming that the maximum value of the three color component values (R component value, G component value, B component value, in this embodiment) is a first value, the minimum value thereof is a second value, and an intermediate value between the maximum value and minimum value is a third value, it can be said that a color in the vicinity of the hue value for equal difference is a color in which the third value is comparatively close to an average value of the first and second values. Thus, it can be said that, when the third value is comparatively close to the average value of the first and second values, a pixel having a pixel value (i.e., color value) constituted by the first to third values is defined to have a comparatively high hue change degree.

Further, as is clear from FIG. 6, in the present embodiment, the second hue range HR2 is set in hue ranges in the vicinity of three hue values for maximum first difference (H=0, 120, 240) and three hue values for maximum second difference (H=60, 180, 300), specifically, hue ranges of ±15 from the respective hue values for maximum first difference and respective hue values for maximum second difference. Further, as can be seen from FIG. 8A, the first weight W1 smaller than that allocated to the first hue range HR1 is allocated to the second hue range HR2, so that a pixel having a hue value within the second hue range HR2 is defined to have a comparatively low hue change degree. As a result, the hue change degree of the pixel constituting the target image can adequately be defined according to the hue value H, when the density correction is executed. Thus, it is possible to determine the appropriate density correction method.

Assuming that the maximum value of the three color component values (R component value, G component value, B component value, in the first embodiment) is a first value, the minimum value thereof is a second value, and the intermediate value thereof is a third value, it can be said that a color in the vicinity of the hue value for maximum first difference and hue value for maximum second difference is a color in which the third value is comparatively close to one of the first and second values relative to an average value of the first and second values. Thus, it can be said that, when the third value is comparatively close to one of the first and second values, a pixel having a pixel value (i.e., color value) constituted by the first to third values is defined to have a comparatively low hue change degree.

According to the first embodiment described above, the density correction method is determined based on the index value TV representing the hue change degree. Specifically, the first method is determined as the density correction method when the hue change degree is lower than a reference. The second method is determined as the density correction method when the hue change degree is higher than the reference (FIG. 2). As a result, the density correction can be executed using a method adequate for the target image data. More specifically, simple density correction like the first method of the first embodiment is executed for a target image in which the hue thereof is unlikely to change. In other words, complicated density correction like the second method of the first embodiment is not executed for the target image in which the hue thereof is unlikely to change, whereby a processing load or processing time can be prevented from being excessively increased.

Further, the complicated density correction like the second method is executed for a target image in which the hue thereof is likely to change. In other words, the simple density correction like the first method of the first embodiment is not executed for the target image in which the hue thereof is unlikely to change, whereby the hue of the target image can be prevented from being significantly changed. Thus, a user can acquire efficiently target image data that has been subjected to desired density correction according to characteristics of the target image data.

Further, as shown in FIGS. 6 and 8A, the pixel defining unit 125 defines the hue change degree for each pixel such that a pixel in which the hue change degree is defined to be comparatively low and a pixel in which the hue change degree is defined to be comparatively high alternately and periodically appear with the sequential change in the hue value H of each pixel. In other words, as a hue value of the one pixel changes sequentially, the degree of change in hue for the one pixel switches a first degree and a second degree alternately and periodically. The first degree is a comparatively-high degree of change in hue for the one pixel. The second degree is a comparatively-low degree of change in hue for the one pixel. As a result, an adequate index value TV can be calculated by using the characteristics of the hue value H as described using FIGS. 10 to 13, i.e., characteristics in which the hue change degree periodically changes with the sequential change in the hue value. As a result, the hue change degree of the target image can be defined adequately according to the hue value H, so that an adequate density correction method can be determined.

Further, as shown in FIG. 6, the first hue range HR1 and second hue range HR2 are set within the range that the hue value H can assume. As can be seen from the calculation expression of FIG. 7, the defining unit 120 defines the index value TV in accordance with a ratio between the number of pixels having the hue value H within the first hue range HR1 and the number of pixels having the hue value H within the second hue range HR2. A target image with a higher proportion of pixels in which the hue change degree is high can be considered to be higher in the hue change degree. Thus, a ratio between the number of pixels in which the hue change degree is comparatively high and number of pixels in which the hue change degree is comparatively low is preferably taken into consideration for defining the hue change degree of the target image (i.e., for calculating the index value TV). According to the present embodiment, the first hue range HR1 and second hue range HR2 which are set within the range that the hue value H can assume are used to calculate the index value TV according to the ratio between the number of pixels in which the hue change degree is comparatively high and number of pixels in which the hue change degree is comparatively low, so that an adequate color conversion processing method can be determined.

Further, as shown in FIGS. 4, 5, and 8A, the defining unit 120 defines the index value TV by using the brightness value V of each pixel in addition to the hue value H. Specifically, the first brightness range VR1, second brightness range VR2, and third brightness range VR3 are set within a range that the brightness value V can assume (FIG. 4, FIG. 5), and the hue change degree of each pixel is defined (i.e., the first weight W1 is determined (FIG. 8A) depending on to which range the brightness value V belongs. In some cases, it is preferable for the defining unit 120 to take the brightness value V into consideration for defining the hue change degree of the target image. For example, the hue change is less noticeable in an image (e.g., a dark image) having a small brightness value, so that the hue change degree of such an image is preferably defined to be low. In the present embodiment, the use of the brightness value V can adequately calculate the index value TV. Thus, an appropriate density correction method can be determined.

Further, the defining unit 120 defines the index value TV by using the γ value representing the correction level of the density correction, i.e., a value representing a level at which a pixel value of each of a plurality of pixels in the target image is changed by the density correction. Specifically, the defining unit 120 uses the second weight W2 (FIG. 8B) defined in accordance with the γ value for calculation of the index value TV (FIG. 7). The hue change degree of the target image changes depending on the correction level. For example, the lower the correction level of the target image, the smaller a change amount of pixel values in the target image by the density correction, and the hue change degree of the target image may be lowered. Thus, the correction level is preferably taken into consideration for defining the hue change degree of the target image (i.e., for calculating the index value). In the first embodiment, an adequate density correction method can be determined in accordance with the correction level of the density correction.

B. Second Embodiment

Figure 14:
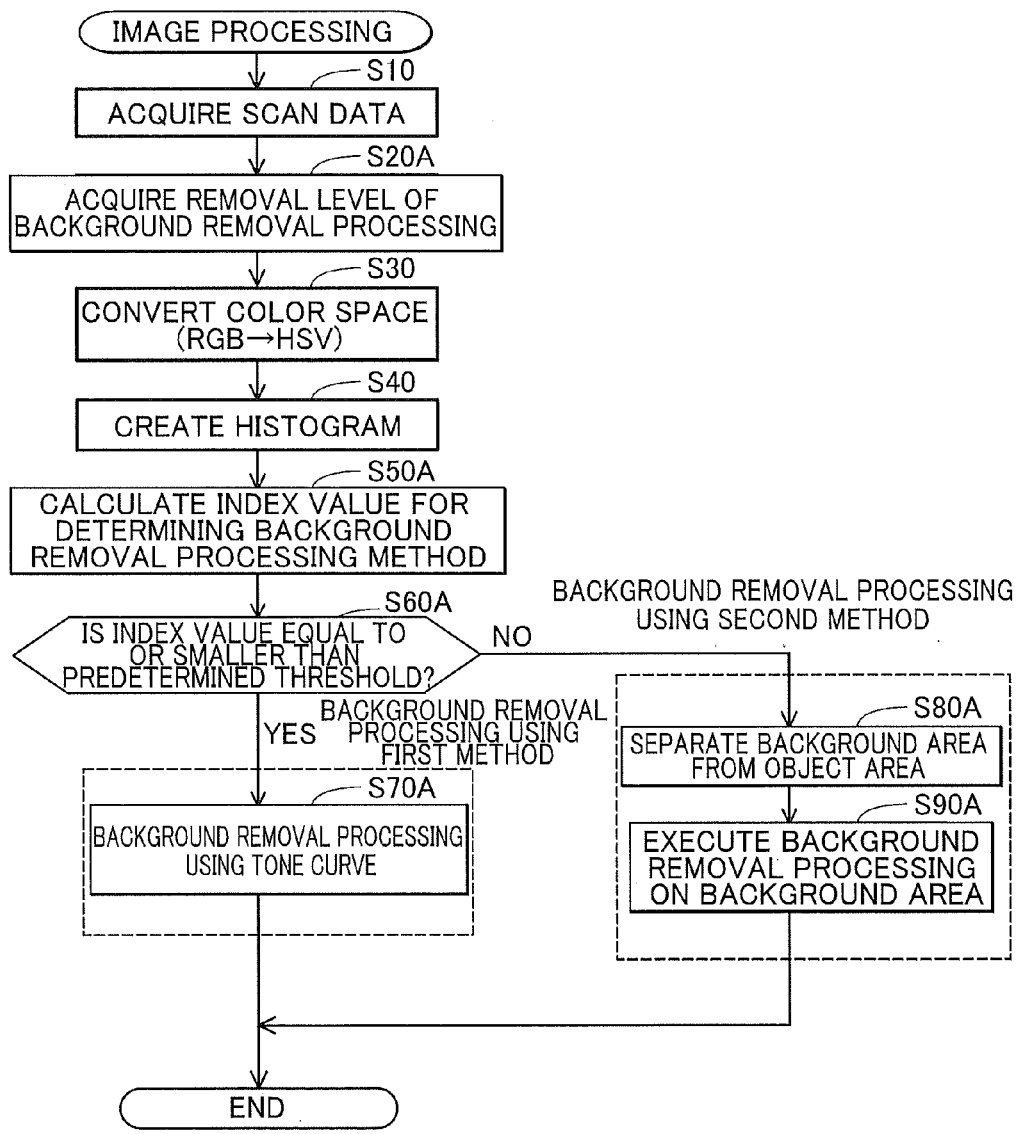
FIG. 14 is a flowchart illustrating steps in an image processing executed by the image processing device according to a second embodiment of the present invention.

FIG. 14 is a flowchart of the image processing according to a second embodiment. In FIG. 14, the same reference numerals are given to the same steps as those in the image processing (FIG. 2) according to the first embodiment, and "A" is added to each of the reference numerals of different steps.

In the image processing of the second embodiment, background removal processing is executed in place of the density correction of the first embodiment. The background removal processing is executed for converting a color of a background image into white when an image like a text document in which the color of the background is not important is printed. When image data after the background removal processing is used to print an image, a consumption amount of a printing material, such as toner or ink, can be reduced. Specifically, in place of step S20 and steps S50 to S100 in the image processing (FIG. 2) of the first embodiment, steps S20A and steps S50A to S90A shown in FIG. 14 are executed.

As in the first embodiment, scan data is acquired as the target image data (S10). In S20A of FIG. 14, the image processing unit 100 acquires a removal level RL of the background removal processing. The removal level RL is input by the user through a predetermined input screen UI as in the case of the input of the correction level in the first embodiment. Alternatively, the image processing unit 100 itself may identify a color of the background area of an image represented by the target image data, and determine the removal level RL so as to allow the identified color of the background area to be removed.

Figures 15, 16:
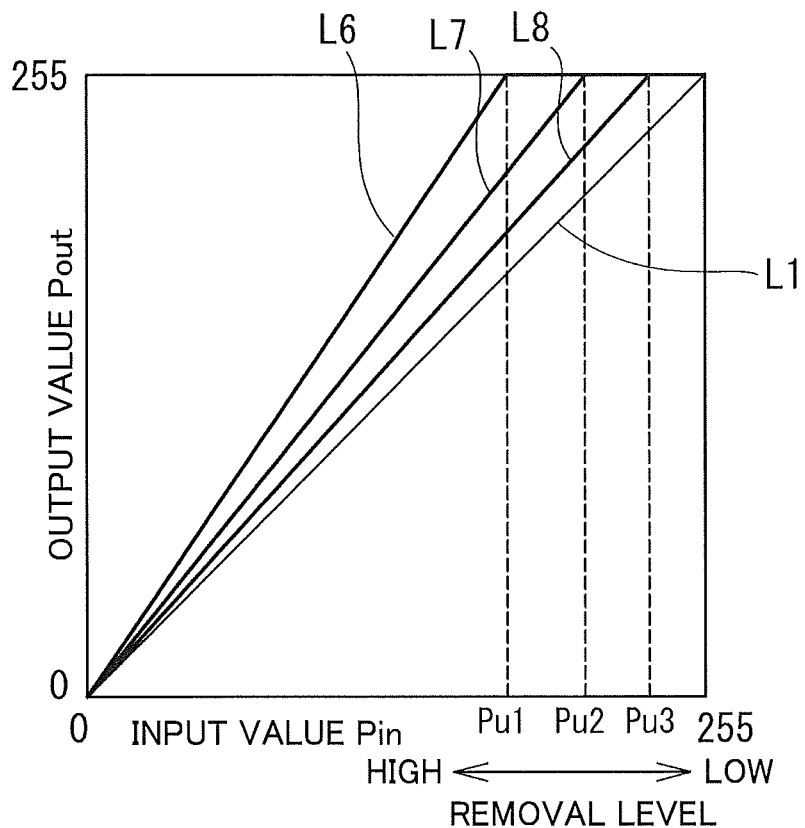
FIG. 15 is a graph for explaining tone curves according to removal revels in the second embodiment.
FIG. 16 shows an example of an weight table used in the second embodiment.

FIG. 15 is a view for explaining a tone curve according to the removal revel RL. A graph of FIG. 15 shows an example of tone curves used in the background removal processing. In the graph of FIG. 15, a horizontal axis represents an input value Pin, and a vertical axis represents an output value Pout. Each tone curve of FIG. 15 is a polygonal curve constituted by two straight lines.

In the second embodiment, the removal level RL is represented by an inverse number of a lower limit value Pu of a removal range. The removal range is a range of a color to be converted into white by the background removal processing. The reason for using the inverse number is that the smaller the lower limit value Pu of the removal range, the larger the removal range, and the higher the removal level. For example, the lower limit values Pu of the removal ranges in three tone curves L6, L7, and L8 are Pu1, Pu2, and Pu3, respectively (Pu1<Pu2<Pu3). As shown in FIG. 15, the removal level RL obtained when the tone curve L6 is used is higher than the removal level RL obtained when the tone curve L7 is used. Further, the removal level RL obtained when the tone curve L7 is used is higher than the removal level RL obtained when the tone curve L8 is used.

The tone curve L6 (FIG. 15) in which Pu is set to Pu1 converts the input value Pin within a range (hereinafter, referred to as "removal range") of Pu1≤Pin≤255 (i.e., maximum gray level value) into 255 (i.e., maximum gray level value). Further, the tone curve L6 associates the output value Pout within a range of 0≤Pout<255 with the input value Pin within a range of 0≤Pin<Pu1 such that the output value Pout linearly changes with a change in the input value Pin. As a result, when the tone curve L6 is applied to each of the RGB three color component values, a color of a pixel having RGB values satisfying Pu1≤R≤255, Pu1≤G≤255, and Pu1≤B≤255 into white (255, 255, 255). As described above, in the background removal processing, a color of a pixel having a color closer to white than a predetermined reference point is converted into white, whereby a color of the background of the target image can be removed. However, the hue of an area (e.g., an object area representing an object such as a photograph or a drawing) in the target image other than the background area is likely to change when the tone curve L6 is applied to all the pixels constituting of the target image. Although a background area having higher density can be removed as the removal level RL of the background removal processing becomes higher, i.e., as the removal range becomes large, a possibility that the hue of the object area changes by the background removal processing becomes high.

As can be seen from FIG. 15, each of the tone curves L6 to L8 used in the background removal processing of the second embodiment has an upwardly convex shape. Further, the tone curves L6 to L8 do not cross a straight line L1 representing that the input value Pin and output value Pout are equal to each other. In other words, the tone curves L6 to L8 each do not have an intersection with the straight line L1.

After acquisition of the removal level RL, conversion of the pixel value of the target image data (conversion from the RGB color space into HSV color space: S30) and creation (S40) of the histogram HG are executed, as in the first embodiment.

After creation of the histogram HG, in S50A, the defining unit 120 uses the histogram HG to calculate an index value SV of a target image represented by the target image data. The index value SV is a value for determining a background removal processing method, and a value representing the hue change level of the target image when the background removal processing is applied to the target image data. The index value SV is calculated using basically the same calculation expression as that (FIG. 7) for calculating the index value TV of the first embodiment. The calculation expression for the index value SV differs from that for the index value TV in concrete numerical values of the second weight W2.

FIG. 16 is an example of a table defining the second weight W2 of the second embodiment. In the second embodiment, the defining unit 120 referrers to the table of FIG. 16 in place of the table of FIG. 8B used in the first embodiment, in order to acquire the second weight W2. The table of FIG. 16 is recorded in the parameter data 224.

The second weight W2 of the second embodiment is a value having a positive correlation with the hue change degree of the target image when the background removal processing is executed. That is, like the second weight W2 of the first embodiment, the larger the second weight W2 is, the higher the hue change degree; on the other hand, the smaller the second weight W2 is, the lower the hue change degree. As shown in FIG. 16, the second weight W2 is defined such that the smaller the lower limit value Pu of the removal range, the larger the second weight W2 and the larger the lower limit value Pu of the removal range, the smaller the second weight W2.

In the above step S50A, the defining unit 120 calculates the index value SV of the target image by using the second weight W2 of FIG. 16 in addition to the first weight W1, the number PN(CN) of pixels belonging to each class set in the histogram HG, and total number $PN_{total}$ of pixels in the histogram HG which have been described in the first embodiment.

After calculation of the index value SV, in step S60A, the determining unit 130 determines whether the index value SV is equal to or smaller than a predetermined threshold TH2. When the index value SV is equal to or smaller than the predetermined threshold TH2 (YES in S60A), that is, when the index value SV represents that the hue change degree is equal to or lower than a reference, the determining unit 130 determines to execute the background removal processing using a first method, and a processing flow of this routine proceeds to step S70A. On the other hand, when the index value SV is larger than the predetermined threshold TH2 (NO in S60A), that is, when the index value SV represents that the hue change degree is higher than the reference, the determining unit 130 determines to execute the background removal processing using a second method, and the processing flow proceeds to steps S80A and S90A.

As in the first embodiment, the first method is simpler than the second method. Thus, a processing load incurred by the first method is lower than that of the second method. A possibility that the hue of the object area in the target image after the processing changes is higher in a case where the first method is used than in a case where the second method is used.

Specifically, in 570A, the color conversion unit 140 executes the background removal processing using the first method. More specifically, as the first method, the color conversion unit 140 applies the tone curve L6 of FIG. 15 to each of the three component data (R component data, G component data, B component data) included in the target image data to thereby correct the three component data.

In steps S80A and S90A, the color conversion unit 140 executes the background removal processing according to the second method. Specifically, in S80A, the color conversion unit 140 analyzes the target image data to separate the background area in the target image from the object area. The separation may be achieved by various known methods. For example, the color conversion unit 140 calculates edge intensity of each pixel of the target image and separates, as the background area, an area having edge intensity lower than a predetermined reference value and closer to white than a predetermined reference point.

In S90A, the color conversion unit 140 executes the background removal processing on the background area separated by the color conversion unit 140. That is, the color conversion unit 140 converts a color of the area separated as the background area into white to thereby remove the background. After completion of the background removal processing for the target image data, the image processing unit 100 ends the image processing.

According to the second embodiment described above, the background removal processing can be executed using a method appropriate to the target image data.

C. Third Embodiment

Figure 17:
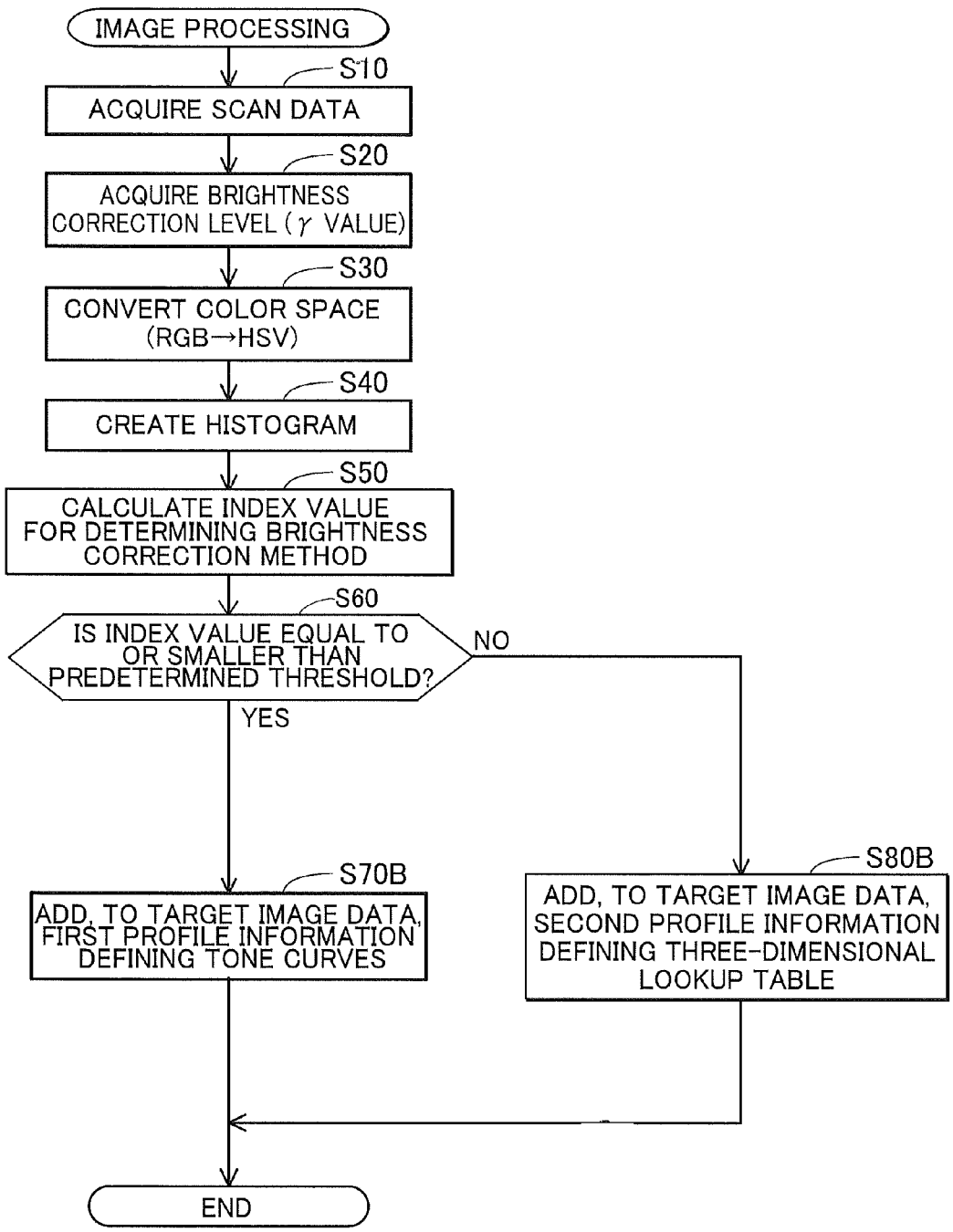
FIG. 17 is a flowchart illustrating steps in an image processing executed by the image processing device according to a third embodiment of the present invention.

FIG. 17 is a flowchart of the image processing according to a third embodiment. The image processing of the third embodiment differs from that (FIG. 2) of the first embodiment only in that step S70B and S80B of FIG. 17 are executed in place of step S70 and steps S80 to S100 of FIG. 2, respectively. Other steps in the image processing of the third embodiment are the same as those of the image processing (FIG. 2) of the first embodiment denoted by the same reference numerals, and descriptions thereof will be omitted.

The nonvolatile storage device 220 of the multifunction peripheral 200 according to the third embodiment previously stores therein, for each correction level, first profile information defining the tone curves (FIG. 9) for executing the density correction (step S70) using the first method in the first embodiment, and second profile information defining a three-dimensional lookup table for executing the density correction (S80 to S100) using the second method in the first embodiment. The above first and second profile information are each profile information (so-called an ICC profile) created according to, e.g., standards promulgated by the International Color Consortium (ICC). The three-dimensional lookup table is a table associating RGB values as an input value and RGB values after the density correction. The three-dimensional lookup table is a known table, so detailed descriptions thereof will be omitted. A data size required for defining the tone curves of FIG. 9 is significantly smaller than a data size required for defining the three-dimensional lookup table. Accordingly, a data size of the first profile information is significantly smaller than a data size of the second profile information.

In S70B, the profile processing unit 150 adds the first profile information to the target image data. In S80B, the profile processing unit 150 adds the second profile information to the target image data. Specifically, the profile processing unit 150 stores the target image data in a file of a format in which the target image data can be stored in association with the profile information, and stores the first profile information (S70B) or second profile information (step S80B) in a predetermined area (header area, etc.) of the file. Example of the file format in which the profile information can be stored in association with, e.g., the image data include a PDF format, a JPEG format, and a TIFF format.

The target image data added with the profile information is supplied to, e.g., the personal computer 300. The personal computer 300 can execute the density correction for the target image data according to the added profile information.

According to the third embodiment described above, it is possible to add, to the target image data, profile information adequate for the content of the target image data. For example, profile information of a size larger than necessary can be prevented from being added to target image data representing a target image in which the hue is unlikely to change, thereby preventing the size of the file including the target image data and profile information from being excessively increased. Further, it can prevent from an excessive increase in a processing load of an apparatus (e.g., the personal computer 300) that executes the density correction according to the added profile information. Further, when the density correction is executed according to the added profile information, it is possible to reduce a possibility that satisfactory image quality cannot be obtained due to addition of the profile information for applying simple density correction to target image data representing a target image in which the hue is likely to change. In other words, satisfactory image quality can be obtained if the hue of target image is likely to change.

D. Modifications

While the invention has been described in detail with reference to the embodiments thereof, it would be apparent to those skilled in the art that various changes and modifications may be made therein without departing from the spirit of the invention.

(1) The image processing unit 100 determines the density correction method in the first embodiment; however, the image processing unit 100 may determine a contrast correction method or a saturation correction method instead of the density correction method. The image processing unit 100 determines the background removal processing method in the second embodiment; instead, however, the image processing unit 100 may determine a method for processing that converts a color of a specific object, such as color conversion processing that optimizes person's skin color or sky's blue color. In general, the image processing unit 100 may determine methods of all sorts of color conversion processing. However, the image processing unit 100 preferably determine a method for one of processing (density correction, contrast correction, saturation correction, etc.) for changing color-related characteristics differing from the hue and processing (background removal processing, processing for optimizing person's skin color or sky's blue color) for changing a color of a part of area of the target image.

(2) The defining unit 120 calculates the index value TV by using the calculation expression of FIG. 7 in the first embodiment; instead, however, the defining unit 120 may calculate the index value according to another method. For example, the defining unit 120 may count only the number of pixels having the hue value H within the first hue range HR1 without counting the number of pixels having the hue value H within the second hue range HR2. In this case, the defining unit 120 directly uses the count value of the number of pixels having the hue value H within the first hue range HR1 as the index value. Further, the index value TV (SV) is compared with one threshold TH, and the method for executing the density correction is selected from among the first and second methods in the first, second, and third embodiments; instead, however, the index value TV (SV) may be compared with two or more thresholds. That is, the method for executing the density correction may be selected from among the three or more methods.

(3) In the first to third embodiments, as shown in FIG. 6, the hue change degree is defined for each pixel by using the first hue range HR1 in which the hue change degree is defined to be high with respect to the sequential change in the hue value H (i.e., with which the first weight W1, which is a comparatively large value, is associated) and the second hue range HR2 in which the hue change degree is defined to be low (i.e., with which the first weight W1, which is a comparatively small value, is associated). Then, the first hue range HR1 and second hue range HR2 are arranged so as to alternately and periodically appear with the sequential change in the hue value H. However, the present invention is not limited to this. For example, a function F (H) repeated periodically with the change in the hue value H may be used. A value of this function F (H) is used as the weight W1 (i.e., W1=F (H)) to define the hue change degree for each pixel. As the function F (H), a function (e.g., trigonometric function) assuming a value that becomes maximum in the vicinity of the hue value for equal difference (H=30, 90, 150, 210, 270, 330) and becomes minimum in the vicinity of the hue value for maximum first difference (H=0, 120, 240) and hue value for maximum second difference (H=60, 180, 300) is preferably selected.

(4) The acquisition unit 110 converts the color space of the target image data from the RGB color space into the HSV color space so as to calculate the hue value H or brightness value V in the first to third embodiments. However, another color space may be used instead of the HSV color space. For example, the acquisition unit 110 may convert the color space of the target image data from the RGB color space into the CIELAB color space. In this case, for example, the acquisition unit 110 may use an a* value and a b* value in the CIELAB color space to calculate the hue value H according to an expression: $\tan H = (b^*/a^*)$. Further, in this case, the defining unit 120 may calculate the index value TV by using an L* value in place of the brightness value V.

(5) In the first embodiment, the first method is a method that applies the tone curves to each of the color component values of the RGB values without performing color conversion, and second method is a method that performs color conversion once before the application of the tone curves and once thereafter so as to apply the tone curves to the luminance value Y. Further, in the second embodiment, the first method is a method that is not accompanied by analysis of the target image data, and the second method is a method that is accompanied by the analysis of the target image data. However, the present invention is not limited to this, but a combination of various methods having different processing loads from each other can be adopted as a combination of the first and second methods.

(6) In the third embodiment, the first profile information is a profile for defining the tone curves, and the second profile information is a profile for defining the three-dimensional lookup table. However, the present invention is not limited to this. A combination of various profile information having different data sizes from each other can be adopted as a combination of the first and second profile information. For example, the first profile information may be information defining a three-dimensional lookup table in which the number of grids is smaller than a predetermined reference value, and the second profile information may be information defining a three-dimensional lookup table in which the number of grids is larger than the predetermined reference value.

(7) In the first to third embodiments, there are set in the HSV color space, the six partial color spaces partitioned based on ranges of the hue value H and ranges of the brightness value V. The defining unit 120 creates the histogram HG by counting the number of pixels belonging to each partial color space. The defining unit 120 defines the hue change degree for each of a plurality of pixels belonging to one partial color space. That is, the defining unit 120 defines the first weight W1 by which each of a plurality of pixels belonging to one partial color space is multiplied. Alternatively, however, a more number of partial color spaces may be set by defining ranges of the saturation value S. Further alternatively, the CIELAB color space may be adopted in place of the HSV color space. In general, preferably the defining unit 120 sets a plurality of partial color spaces and defines the hue change degree for each of a plurality of pixels having a color belonging to one partial color space.

(8) Image processing function of the image processing unit 100 of the multifunction peripheral 200 may be realized by the personal computer 300. For example, a scanner driver program including a computer program for realizing the image processing function may be installed in the personal computer 300. In this case, the scanner driver of the personal computer 300 may execute the image processing (e.g., processing of FIG. 2) for scan data acquired using a scanner connected to the personal computer 300. Further, in place of the multifunction peripheral 200, another image processing device (e.g., a scanner or a digital camera) including an image reading section that generates image data representing an object by optically reading the object may be used. In this case, as in the multifunction peripheral 200, the image processing device can execute the image processing (e.g., processing of FIG. 2) by using the image data generated in the image reading section thereof.

In general, the image processing device that realized the image processing (e.g., processing of FIG. 2) is not limited to the multifunction peripheral 200. The image processing device may be any of various devices, such as a computer provided in an image processing-related equipment (printer, digital camera, scanner, etc.), a general-purpose personal computer, and a network connected server. Further, a configuration may be adopted in which the image processing function is realized by cooperation of a plurality of computers that can communicate with each other over a network. That is, in this configuration, each of the computers shares a part of the image processing function. In this case, the plurality of computers correspond to an image processing device in the claims of the invention.

(9) In each of the above embodiments and modifications, a part of the configuration realized by hardware may be replaced with software; on the other hand, a part of or all the configurations realized by software may be replaced with hardware.

What is claimed is:

1. An image processing device comprising:
a processor; and
a memory storing computer-readable instructions therein, the computer-readable instructions, when executed by the processor, causing the image processing device to perform:
acquiring a plurality of hue values from an image, the image including the plurality of pixels having a plurality of hue values, each of the plurality of pixels having corresponding one of the plurality of hue values, each of the plurality of hue values indicating hue of corresponding one of the plurality of pixels;
determining an index value of the image based on the plurality of hue values, the index value representing a degree of change in hue of the image before and after executing a color conversion on the image; and
setting a color conversion method to a first method when the index value represents that the degree of change in hue of the image is comparatively low, and setting the color conversion method to a second method when the index value represents that the degree of change in hue of the image is comparatively high, the second method being different from the first method;
wherein a processing load incurred by the first method is lower than a processing load incurred by the second method;
wherein a possibility that the hue of the image changes after color conversion is executed according to the first method is higher than a possibility that the hue of the image changes after color conversion is executed according to the second method.

2. The image processing device according to claim 1, wherein the determining comprises:
determining a plurality of degrees of change in hue for the plurality of pixels based on the plurality of hue values, each of the plurality of degrees of change in hue for the plurality of pixels corresponding to one of the plurality of pixels, each of the plurality of pixels having a color represented by a plurality of color component values, the plurality of color component values including a first value, a second value, and a third value, the largest component value among the plurality of color component values being defined as the first value, the smallest component value among the plurality of color component values being defined as the second value, a color component value smaller than the first value and larger than the second value being defined as the third value; and
determining the index value of the image based on the plurality of degrees of change in hue for the plurality of pixels,
wherein, if one pixel of the plurality of pixels has the plurality of color component values in which the third value is closer to one of the first value and the second value than to an average value of the first value and the second value, a degree of change in hue for the one pixel is determined to be comparatively low;
wherein, if one pixel of the plurality of pixels has the plurality of color component values in which the third value is closer to the average value than to the first value and the second value, a degree of change in hue for the one pixel is determined to be comparatively high.

3. The image processing device according to claim 2, wherein, as a hue value of the one pixel changes sequentially, the degree of change in hue for the one pixel switches a first degree and a second degree alternately and periodically, the first degree being a comparatively-high degree of change in hue for the one pixel, the second degree being a comparatively-low degree of change in hue for the one pixel.

4. The image processing device according to claim 1, wherein at least one of the first method and the second method is a method in which a tone curve is used, the tone curve defining relationships between input values and output values, the tone curve having no intersection with a straight line indicating that the output values are equal to respective input values.

5. The image processing device according to claim 1, wherein the hue value of each of the plurality of pixels falls within a predetermined range, the predetermined range being divided into a first hue range and a second hue range; wherein the index value is determined based on a ratio of a pixel number of pixels whose hue value falls within the first range to a pixel number of pixels whose hue value falls within the second range.

6. The image processing device according to claim 1, wherein the index value is determined based on both the plurality of hue values and a plurality of brightness values of the plurality of pixels.

7. The image processing device according to claim 1, wherein each of the plurality of pixels has a pixel value, wherein the index value is determined based on the plurality of hue values and a level value, the level values representing a degree at which the pixel value changes before and after the color conversion.

8. The image processing device according to claim 1, wherein the color conversion includes at least one of a process for changing color-related characteristics differing from the hue and a process for changing a color of a part of the image.

9. The image processing device according to claim 1, wherein the color conversion method is set to the first method when the index value is smaller than or equal to a prescribed value, wherein the color conversion method is set to the second method when the index value is greater than the prescribed value.

10. The image processing device according to claim 1, wherein the first method includes a process for changing a color of an entirety of the image and excludes a separating process for separating a certain area from the image;
wherein the second method includes the separating process and a process for changing a color of the certain area.

11. The image processing device according to claim 1, wherein the first method is a method in which a tone curve is used, the tone curve defining relationships between input values and output values, the tone curve having no intersection with a straight line indicating that the output values are equal to respective input values;
wherein the second method is a method in which a three-dimensional lookup table is used.

12. A non-transitory computer readable storage medium storing computer-readable instructions, when executed by a processor, causing an image processing device to perform:
acquiring a plurality of hue values from an image, the image including the plurality of pixels having a plurality of hue values, each of the plurality of pixels having corresponding one of the plurality of hue values, each of the plurality of hue values indicating hue of corresponding one of the plurality of pixels;
determining an index value of the image based on the plurality of hue values, the index value representing a degree of change in hue of the image before and after executing a color conversion on the image; and
setting a color conversion method to a first method when the index value represents that the degree of change in hue of the image is comparatively low, and setting the color conversion method to a second method when the index value represents that the degree of change in hue of the image is comparatively high, the second method being different from the first method;
wherein a processing load incurred by the first method is lower than a processing load incurred by the second method;
wherein a possibility that the hue of the image changes after color conversion is executed according to the first method is higher than a possibility that the hue of the image changes after color conversion is executed according to the second method.

13. The image processing device according to claim 1, wherein the first method includes a process for changing a color of a part of the image and excludes a color space conversion for converting color component values defined in one color space into color component defined in another color space;
wherein the second method includes the color space conversion and a process for changing a color of a part of the image on which the color space conversion has been executed.

14. The non-transitory computer readable storage medium according to claim 12, wherein the determining comprises:
determining a plurality of degrees of change in hue for the plurality of pixels based on the plurality of hue values, each of the plurality of degrees of change in hue for the plurality of pixels corresponding to one of the plurality of pixels, each of the plurality of pixels having a color represented by a plurality of color component values, the plurality of color component values including a first value, a second value, and a third value, the largest component value among the plurality of color component values being defined as the first value, the smallest component value among the plurality of color component values being defined as the second value, a color component value smaller than the first value and larger than the second value being defined as the third value; and
determining the index value of the image based on the plurality of degrees of change in hue for the plurality of pixels,
wherein, if one pixel of the plurality of pixels has the plurality of color component values in which the third value is closer to one of the first value and the second value than to an average value of the first value and the second value, a degree of change in hue for the one pixel is determined to be comparatively low;
wherein, if one pixel of the plurality of pixels has the plurality of color component values in which the third value is closer to the average value than to the first value and the second value, a degree of change in hue for the one pixel is determined to be comparatively high.

15. The non-transitory computer readable storage medium according to claim 14, wherein, as a hue value of the one pixel changes sequentially, the degree of change in hue for the one pixel switches a first degree and a second degree alternately and periodically, the first degree being a comparatively-high degree of change in hue for the one pixel, the second degree being a comparatively-low degree of change in hue for the one pixel.

16. The non-transitory computer readable storage medium according to claim 12, wherein the first method includes a process for changing a color of a part of the image and excludes a color space conversion for converting color component values defined in one color space into color component defined in another color space;
wherein the second method includes the color space conversion and a process for changing a color of a part of the image on which the color space conversion has been executed.

17. The non-transitory computer readable storage medium according to claim 12, wherein the first method includes a process for changing a color of an entirety of the image and excludes a separating process for separating a certain area from the image;
wherein the second method includes the separating process and a process for changing a color of the certain area.

18. The non-transitory computer readable storage medium according to claim 12, wherein the first method is a method in which a tone curve is used, the tone curve defining relationships between input values and output values, the tone curve having no intersection with a straight line indicating that the output values are equal to respective input values;

wherein the second method is a method in which a three-dimensional lookup table is used.

* * * * *